Dec. 4, 1951 E. J. INGALLS 2,576,941
FERTILIZER AND SEED DISTRIBUTOR MACHINE
Filed April 17, 1947 3 Sheets-Sheet 1
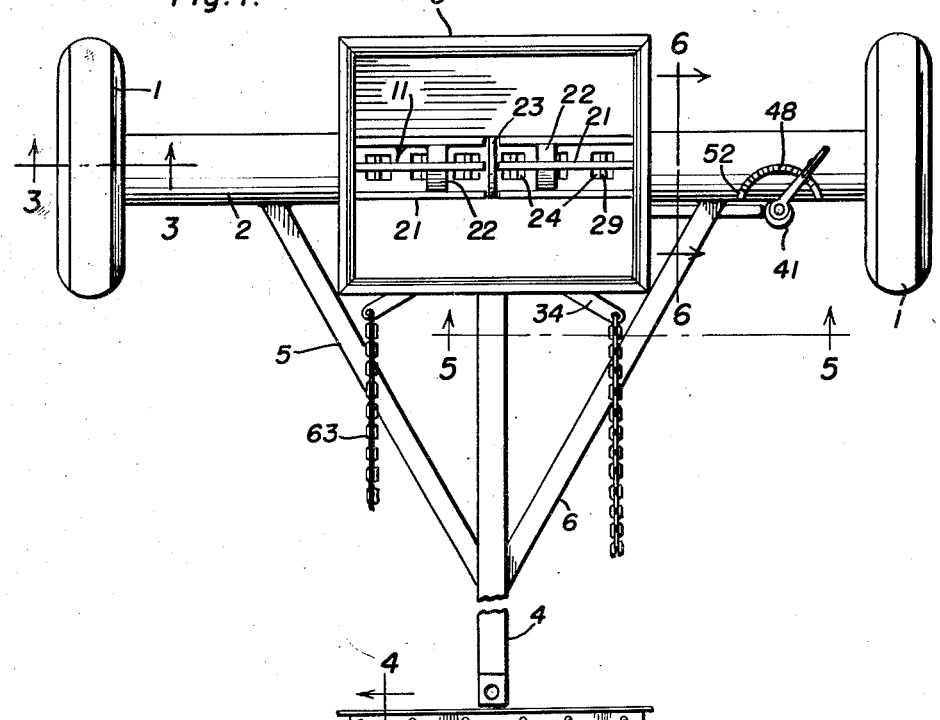
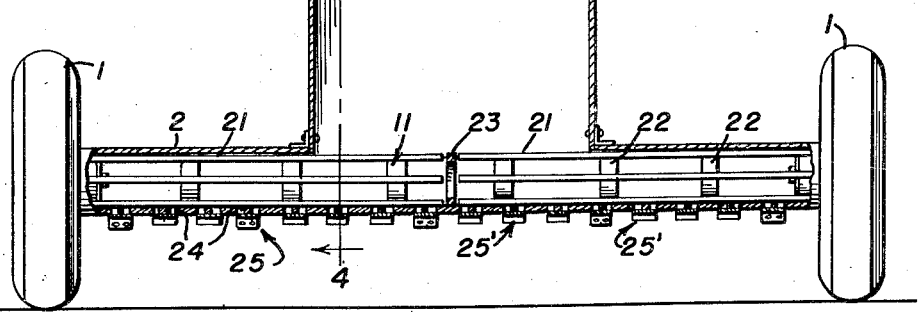
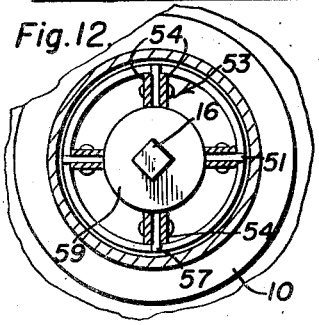
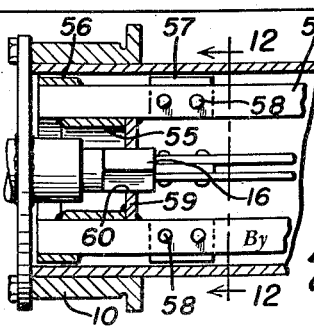
Inventor
Edgar J. Ingalls Dec. 4, 1951     E. J. INGALLS     2,576,941
FERTILIZER AND SEED DISTRIBUTOR MACHINE
Filed April 17, 1947     3 Sheets-Sheet 2
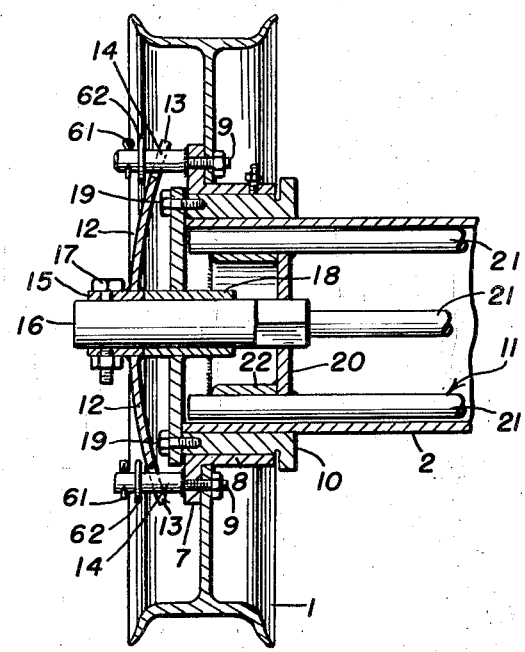
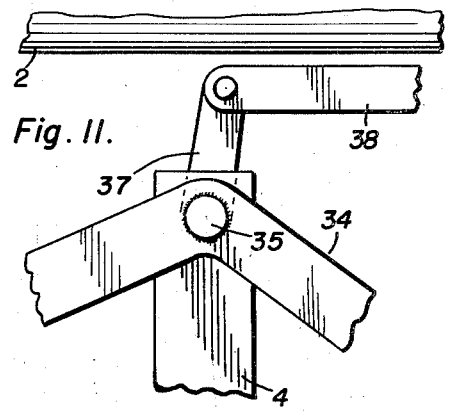
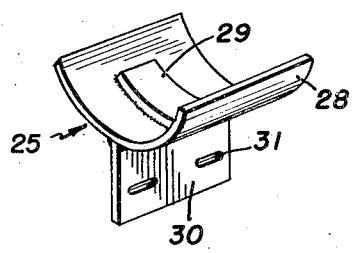
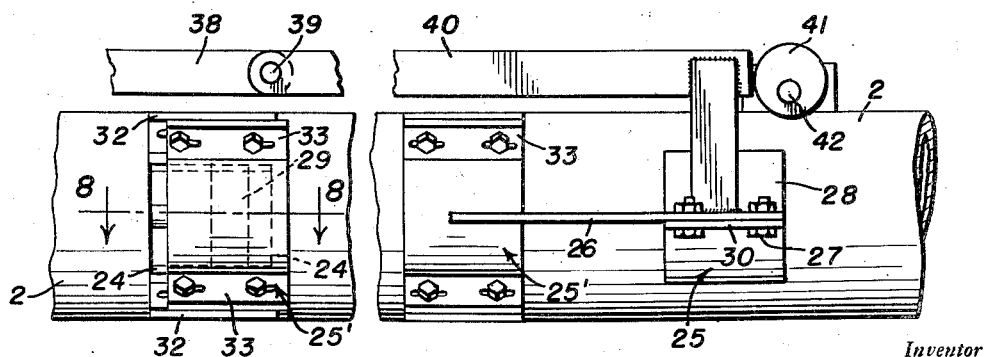
Inventor
Edgar J. Ingalls
By Clarence A. O'Brien
and Harvey B. Jacobson
Attorneys Dec. 4, 1951  E. J. INGALLS  2,576,941
FERTILIZER AND SEED DISTRIBUTOR MACHINE
Filed April 17, 1947  3 Sheets-Sheet 3

Inventor
Edgar J. Ingalls
By Clarence A. O'Brien
and Harvey B. Jackson
Attorneys Patented Dec. 4, 1951

2,576,941

UNITED STATES PATENT OFFICE 2,576,941

FERTILIZER AND SEED DISTRIBUTOR MACHINE

Edgar J. Ingalls, Zachary, La., assignor, by mesne assignments, to Giraud van Nest Foster, Wilson, La.

Application April 17, 1947, Serial No. 742,049

2 Claims. (Cl. 222—177)

The invention relates to improvements in fertilizer and seed distributor machines in which full floating agitators revolve within a pipe. The objects of the invention are, first, to provide a full floating agitator which will thoroughly crush, mix and thrust substantially any commercial fertilizers; second, to provide a second agitator which will thrust seeds through the slots provided in the fertilizer machine; third, to provide a slotted housing for the above mentioned agitators; fourth, to provide adjustable gates to fit in slots of the housing; fifth, to provide a mechanism that will enable the operator to open and close slots cut in the housing of the fertilizer and seed distributor from a position remote from the housing; sixth, to provide suitable lubricated bearings that will support the machine frame and seed or fertilizer; seventh, to provide a driver which will transmit motion from a flange of the bearing to the agitator located within the housing of the fertilizer or seed distributor machine; eighth, to provide a ring or thrust bearing in the center of the machine housing which will prevent the two agitators from interfering with each other's operation; ninth, to provide a cam and lever arrangement which will limit the opening of the gates fitted in the slots of the machine housing; tenth, to provide a suitable hopper that will hold enough seed or fertilizer to distribute over several acres of land before reloading.

Figure 4:
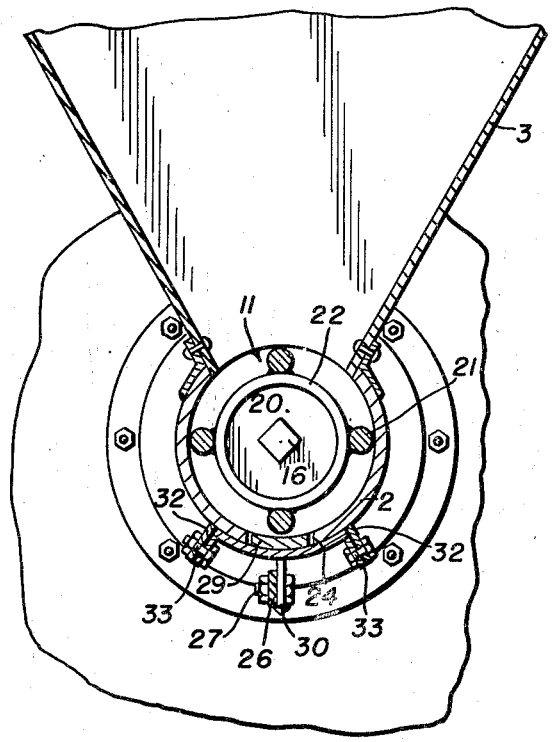
Figure 6:
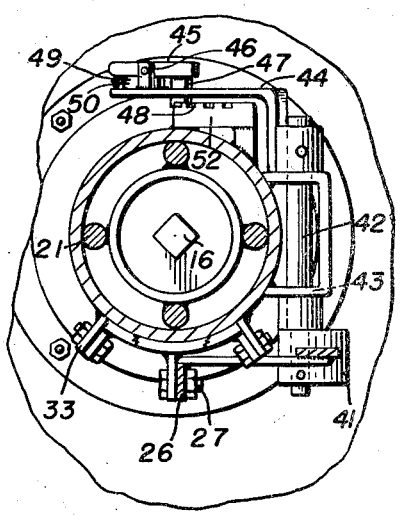
Figure 5:
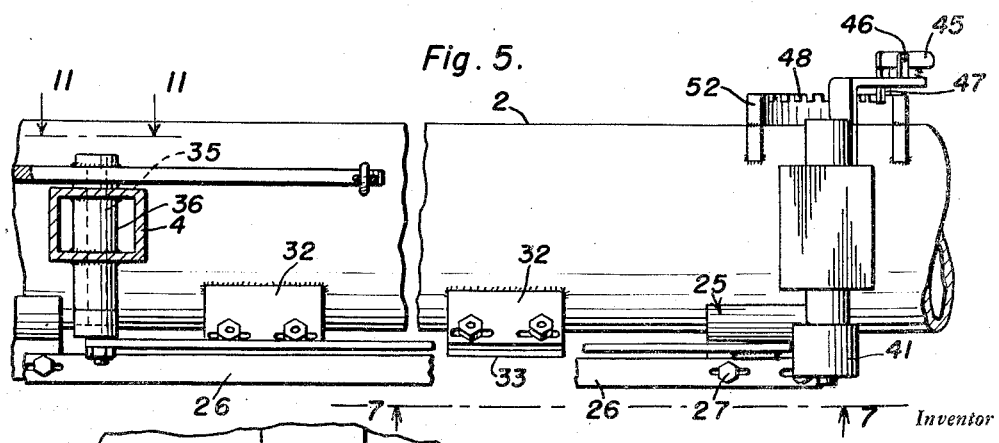
Figure 8:
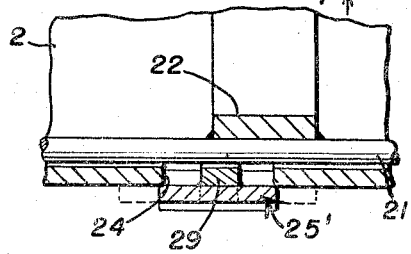

One form of the invention is illustrated in the accompanying drawing, in which Figure 1 is a top view of the machine; Figure 2, is a vertical section of the entire machine; Figure 3, is a partial vertical section taken through the bearing and driver of the machine and on the line 3—3 of Figure 1; Figure 4, is a vertical sectional view taken through the hopper and housing on the line 4—4 of Figure 2 and in the direction of the arrows. Figure 5, is a vertcal section passing through the machine on the line 5—5 of Figure 1; Figure 6 is a vertical sectional view taken on the line 6—6 of Figure 1 and in the direction of the arrows; Figure 7, is a bottom view of the machine showing arrangements of gates, cam stop and control mechanism taken on the line 7—7 of Figure 5; Figure 8, is a vertical section through the machine showing slot and gate arrangement; Figure 9, is a perspective view of one of the gates; Figure 10, is a perspective view of another gate; Figure 11 is an elevational view showing detail of a part of the gate control mechanism and taken on the line 11—11 of Figure 5; Figure 12 is a sectional view of a modified form of the invention taken on the line 12—12 of Figure 13, and Figure 13 is a sectional view of the modification shown in Figure 12.

The wheels 1, the slotted pipe 2, the hopper 3, the tongue 4, and the braces 5 and 6 constitute the framework of the machine. The wheels 1, are attached to the flanges 7, of bearings 8, by five lug bolts 9 and appropriate nuts. The bearing 8, rotates on a cast iron journal 10 which is shrunk to the outer periphery of the pipe 2. Bearing 8 rotates about journal 10.

Rotative motion and torque is transmitted from wheels 1, to agitators 11 by means of a driving mechanism which is held in position by cotter key 61, and washer 62, and which includes a bar 12 with slots 13 cut at each end. The slots 13 are cut to fit around driving pins 14, which are welded to flanges 7. Slotted bar 12, is welded to a sleeve 15, which fits over shaft 16. Shaft 16, and sleeve 15, are attached to each other by means of a bolt 17 which is passed therethrough. Shaft 16 rotates in a bearing 18, which is fastened to the cast iron journal 10, by means of four bolts 19. Shaft 16 has a square end which fits into a square opening in disc 20, which is welded to and forms a part of agitator 11. Agitator 11, consists of four round bars 21, spaced 90° apart and welded to the outer periphery of short pieces of pipe 22, acting as spacers. The agitators 11, are separated by a steel ring 23, welded to the center of the slotted pipe or housing 2. Steel ring or thrust bearing 23 will take any thrust that may be applied to agitators 11.

A series of openings in the form of solts 24, are cut in the bottom of pipe 2, through which fertilizers are thrust by full rotating agitators 11. The flow of fertilizers is controlled by movable gates 25 and 25' some of which are attached to a connecting bar 26, by means of bolts 27.

Gates 25 consist of plates 28, bent to conform to the outer periphery of pipe 2. To these plates are welded lugs 29, of which their widths fit the slots 24, cut in pipe 2. The lengths of the lugs 29, are one half of the lengths of the slots 24, therefore making it possible to open slots 24, through which seeds or fertilizers are thrust.

Rectangular bars 30 having slots 31, are welded to the bottom of plates 28. Slots 31, are provided in order to facilitate the adjustment of lugs 29 with respect to slots 24, and to enable the operator of the machine to distribute fertilizer through any one of the slots 24, therefore making it possible for the machine to be used as a row fertilizer distributor.

Gates 25', are held in position and guided by lugs 32 (Figs. 4 and 7), which are welded to pipe 2. To lugs 32, are bolted other lugs 33, which also act as a guide and hold gates 25' in position. Five of the total number of gates 25', as indicated in Figure 7, are held in position as mentioned above. The remaining gates 25, are held in position by connecting bar 26, rectangular bar 30 and bolts 27.

Some of the discharge openings are controlled by turning lever 34 clockwise or counterclockwise. A clockwise rotation of lever 34 opens the slots 24 under consideration, and a counterclockwise rotation closes these slots 24. If a force is applied to lever 34, a torque will be applied to shaft 35 causing it to revolve in bearings 36, thereby transmitting a torque to crank 37, which transmits motion to connecting link bar 38. Link bar 38 is connected by pin 39 to another link bar 40 which is welded to connecting bar 26. Two chains 63 are attached to lever 34 in order to enable a tractor operator to open and close slots 24 from his position on the tractor.

The openings of slots 24 may be limited by a cam 41 fitted to a shaft 42 which rotates in drilled holes 43, and acts as a bearing for shaft 42. To the top of shaft 42 is attached a lever 44.

Lever 44, consists of a small lever 45 pivoted about the axis of a pin 46. To one end of the lever 45 a rectangular lug 47 is welded. Rectangular lug 47 is so designed so as to fit slots 48, and locks cam 41 in any chosen position. To the other end of lever 45 is welded a round lug 49, to which is fitted a spring 50 which exerts a force on lever 45, and keeps rectangular lug 47 engaged in slots 48. Slots 48, are cut in a circular bar 52 which is welded to pipe 2.

The above described machine may be used for seed distribution by substituting agitator 11 with new agitators 53, shown in the modification of Figures 12 and 13. Agitators 53, consist of rectangular bars 54 welded to four pipe spacers 55. At each end of agitators 53 and at the top of rectangular bars 54, are welded two circular rings 56. These rings act as bearings for agitators 53. Between rectangular bars 54 and opposite slots 24 are fitted pliable flaps 57, which will thrust the seed through slots 24 during rotation of the agitators 53 without harming the seeds. Flaps 57 are held in position by rivets 58 secured to the bars 54. Agitators 53, are driven by the same driving mechanism which was used to drive the fertilizer agitators 11, that is, a disc 59 with a square hole 60 is welded to one end of seed agitators 53. The square end of shaft 16, fits square hole 60. All other features of the machine described above remain unchanged for seed distribution. The seed agitators 53, will thrust seed through slots 24, without any harmful effects.

The operation of the invention is as follows: Seed or fertilizer is placed in the hopper 3 and permitted to fall by gravity into the housing 2. The agitators disposed therein are rotated by the torque derived from the movement of the wheels 1 through the medium of the bar 12, one of which is provided for each wheel 1, imparting rotative movement to each agitator disposed in the housing. Accordingly, the agitators will rotate independent of each other thereby permitting freedom in the tracking of the device when it is attached to a tractor or other prime mover.

The agitators are disposed in the housing 2 so that they are floatingly disposed. The square end of the shaft 16 being disposed in a square opening permits rotative movement of each wheel to be imparted to each agitator and allows slight sliding or axial movement (with respect to the housing 2) of the agitators. In order that no interference between agitators may be encountered the thrust bearing 23 is disposed within the housing and preferably at substantially the center thereof. Hence, each agitator is floatingly disposed and permitted a necessary amount of axial movement for freedom of rotation.

The gate type valves seen at 25' are disposed for opening and closing arrangement of the discharge openings 24 at spaced intervals along the bottom of the housing 2. These gates or valves are operable independent of the remaining gates or valves 25 by manual adjustment. Hence, when it is desired to discharge from only one or any selected number within the capabilities of the apparatus, this may be accomplished by manual adjustment of the screws disposed in the slots. Row seeding or fertilizing may be accomplished in this manner.

The said gates or valves 25 are regulated for discharge or non-discharge by means of the rod 26 which is attached to each valve 25. Through the intermediate linkage including the elements 38, 39, 40 as well as the pivot pin 35 and crank construction 37, all of the valve members 25 may be slid back and forth to open or close the remainder of the discharge openings 24.

In order to dispose equal amounts of fertilizer or seed on the field in operation, it is only necessary to rotate the limiting mechanism handle which operates the cam 41. The cam being disposed at one end of the member 40 will permit movement of the member 40 only until it strikes the periphery of the cam 41. The cam may be locked in selected positions of rotation thereby permitting selected movement of the bar 26 which in turn will reflect in the amount of exposed discharge opening 24.

What I claim is:

1. In a fertilizer and seed distributor, a housing which has an inlet opening and a hopper disposed in communication with said inlet opening, wheels disposed for rotative movement on said housing, agitators disposed in said housing, said agitators being translatable axially in said housing, means drivingly connecting one of said wheels and said agitators, a thrust bearing disposed between said agitators to limit the axial movement thereof, said housing having a plurality of discharge openings therein, a first group of valves slidably disposed on said housing and in opening and closing relationship with some of said openings, means including a plurality of rods for operating said first group of valves, a second group of valves disposed in opening and closing relationship with the remainder of said openings, a cam mounted for rotation on said housing and engaged by one of said rods limiting the travel of said one of said rods to regulate the movement of said first group of valves, said second group of valves being operable independent of said first group of valves, and said agitator drivingly connecting means including a shaft having a multi-sided end and supported by said housing, a plate having a complemental multi-sided opening forming a part of one of said agitators and disposed on said multi-sided shaft end, and a bar connected to said shaft and said one of said wheels.

2. The combination of claim 1 and a locking device disposed on said housing, and means fixing said locking device to said cam whereby said cam may be maintained in selected locked positions.

EDGAR J. INGALLS.

REFERENCES CITED

The following references are of record in the file of this patent:

UNITED STATES PATENTS

| Number | Name | Date |
|---|---|---|
| 221,408 | Hart | Nov. 11, 1879 |
| 1,172,005 | Butterfield | Feb. 15, 1916 |
| 1,840.602 | Pender | Jan. 12, 1932 |
| 1,882,340 | Ryan | Oct. 11, 1932 |
| 2,180,253 | Moore | Nov. 14, 1939 |
| 2,237,849 | Smith | Apr. 8, 1941 |
| 2,318,064 | Delaney | May 4, 1943 |
| 2,323,995 | Hiroshima | July 13, 1943 |
| 2,350,107 | Gandrud | May 30, 1944 |